United States Patent
Zinke et al.

(10) Patent No.: US 12,092,446 B2
(45) Date of Patent: Sep. 17, 2024

(54) MEASUREMENT AND/OR SENSOR DEVICE COMPRISING A CAMERA

(71) Applicant: WIPOTEC GMBH, Kaiserslautern (DE)

(72) Inventors: Bernd Zinke, Mandelbachtal (DE); Stefan Schulz, Kaiserslautern (DE); Rene Elspass, Winnweiler (DE)

(73) Assignee: WIPOTEC GMBH, Kaiserslautern (DE)

( * ) Notice: Subject to any disclaimer, the term of this patent is extended or adjusted under 35 U.S.C. 154(b) by 1142 days.

(21) Appl. No.: 16/472,536

(22) PCT Filed: Dec. 20, 2017

(86) PCT No.: PCT/DE2017/101096
§ 371 (c)(1),
(2) Date: Feb. 2, 2021

(87) PCT Pub. No.: WO2018/113849
PCT Pub. Date: Jun. 28, 2018

(65) Prior Publication Data
US 2021/0156668 A1 May 27, 2021

(30) Foreign Application Priority Data
Dec. 23, 2016 (DE) .......................... 102016125646.3

(51) Int. Cl.
*G01B 11/02* (2006.01)
*G03B 7/091* (2021.01)
(Continued)

(52) U.S. Cl.
CPC ............ *G01B 11/022* (2013.01); *G03B 7/091* (2013.01); *G03B 17/00* (2013.01); *G06T 1/0007* (2013.01);
(Continued)

(58) Field of Classification Search
CPC ...... G01B 11/022; G03B 7/091; G03B 17/00; G06T 1/0007; G06T 1/60
See application file for complete search history.

(56) References Cited

U.S. PATENT DOCUMENTS 5,371,691 A 12/1994 Seki et al.
5,966,677 A 10/1999 Fiekowsky
(Continued)

FOREIGN PATENT DOCUMENTS

CA 2749449 A1 * 3/2012 ......... A61B 1/00006
CN 1622037 A 6/2005
(Continued)

OTHER PUBLICATIONS

"International Search Report" mailed Apr. 5, 2018, issued in corresponding PCT application No. PCT/DE2017/101096, filed Dec. 20, 2017.

*Primary Examiner* — Michael A Lyons
(74) *Attorney, Agent, or Firm* — PERRY + CURRIER, INC.

(57) ABSTRACT

The invention relates to a measurement and/or sensor device, comprising a camera and a memory unit, and comprising data stored in the memory unit for controlling the measurement and/or sensor device, wherein the measurement and/or sensor device has a protection device for the memory unit, which protects the data stored in the memory unit against unauthorized alteration, and the data stored in the memory unit are adjustment data for adjustment of the measurement and/or sensor device.

7 Claims, 1 Drawing Sheet

(51) Int. Cl.
*G03B 17/00* (2021.01)
*G06T 1/00* (2006.01)
*G06T 1/60* (2006.01)
*G06T 7/00* (2017.01)

(52) U.S. Cl.
CPC .............. *G06T 1/60* (2013.01); *G06T 7/0004* (2013.01); *G06T 2207/30108* (2013.01)

(56) References Cited

U.S. PATENT DOCUMENTS

| | | | |
|---|---|---|---|
| 6,035,368 | A | 3/2000 | Habib |
| 6,397,165 | B1 | 5/2002 | Fiekowsky |
| 7,003,676 | B1 | 2/2006 | Weber et al. |
| 7,894,808 | B2 | 2/2011 | Nakayama et al. |
| 9,449,189 | B1 | 9/2016 | Harman et al. |
| 2011/0087899 | A1 | 4/2011 | Fetik |
| 2011/0255666 | A1* | 10/2011 | Liu ............... A61B 6/4405 378/91 |
| 2012/0192274 | A1* | 7/2012 | Odom ............ G06F 21/121 726/23 |
| 2017/0228235 | A1* | 8/2017 | Choi ............... G06F 9/4401 |

FOREIGN PATENT DOCUMENTS

| | | |
|---|---|---|
| CN | 101140765 A | 3/2008 |
| CN | 102833576 A | 12/2012 |
| CN | 102871643 A | 1/2013 |
| CN | 105144699 A | 12/2015 |
| CN | 105335677 A | 2/2016 |
| DE | 4119371 A1 | 12/1991 |
| DE | 4119371 C2 | 2/2001 |
| GB | 2247534 B | 2/1994 |
| JP | 2002223402 A | 8/2002 |
| JP | 2006197291 A | 7/2006 |
| JP | 2011055232 A | 3/2011 |
| RU | 2569577 C1 * | 11/2015 |
| WO | 2014127978 A2 | 8/2014 |
| WO | 2016049259 A1 | 3/2016 |

\* cited by examiner

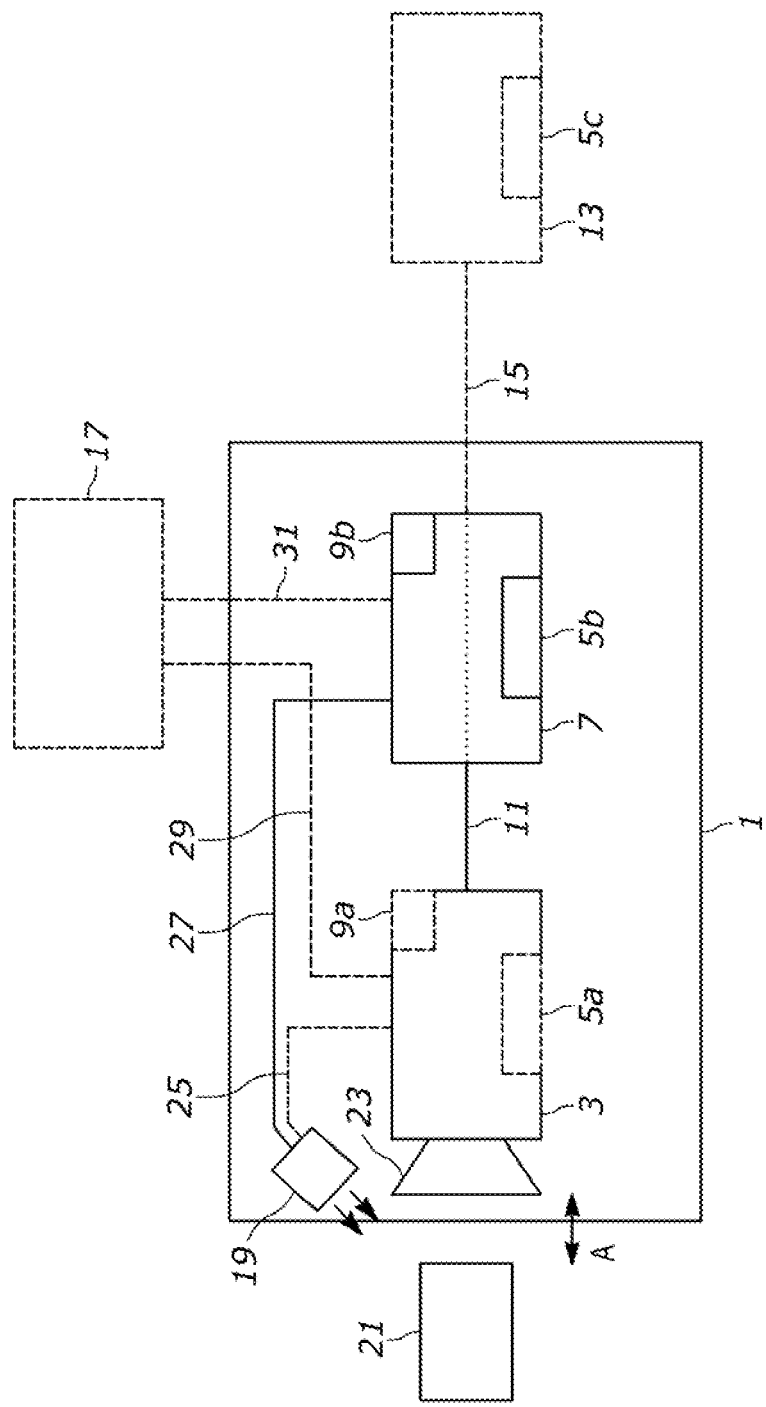

MEASUREMENT AND/OR SENSOR DEVICE COMPRISING A CAMERA

CROSS-REFERENCE TO RELATED APPLICATIONS

The present specification claims priority from PCT Application No. PCT/DE2017/101096, filed Dec. 12, 2017, which in turn claims priority from German Patent Application No. 102016125646.3, filed Dec. 23, 2016, the contents of each is herein incorporated by reference.

FIELD

The invention relates to a measurement and/or sensor device comprising a camera.

BACKGROUND

The invention relates to a measurement and/or sensor device comprising a camera. These types of measurement and/or sensor devices are used in different areas of industry, for example the food industry, pharmaceutical industry, etc., to inspect products and/or their packaging. Labels or inscriptions that exist in the form of barcodes are read and checked, i.e., photographed and analyzed.

BRIEF DESCRIPTION OF THE DRAWINGS

Reference will be made, by way of example only, to the accompanying drawings in which:

FIG. 1 is a block diagram of an example measurement and/or sensor device comprising a camera.

DETAILED DESCRIPTION

The invention relates to a measurement and/or sensor device comprising a camera. These types of measurement and/or sensor devices are used in different areas of industry, for example the food industry, pharmaceutical industry, etc., to inspect products and/or their packaging. Labels or inscriptions that exist in the form of barcodes are read and checked, i.e., photographed and analyzed. These kinds of cameras are also used for measurement purposes, for example in the logistics industry, for the determination of dimensions (length, width, height) of items shipped.

The quality of the detection of product labels, as well as the precision of the dimension measurements, play an important role in today's modern processing and management of large flows of goods as well.

An identification of the technical data content and layout formats must be generated in accordance with certain design rules as well. The layouts prepared in this manner must be applied to a subcarrier or directly onto the product or its packaging by means of high-quality printing or labeling or identification systems. An exact positioning and alignment of the identification is required for this purpose.

At the end of the identification process, the identification must correspond to a number of requirements and specifications and must be of high quality. This high quality level of the identification has to be present not only during the production of a product, but must also be maintained during the subsequent distribution chain of the product, for example until the product is made available to the consumer in the supermarket. Otherwise, if the electronic cash register in the supermarket cannot read the label, the entire upstream production and logistics chain would have been a failure and might result in a rejection of entire delivery batches.

To monitor the quality of identifications (on products), cameras are used at many points of the flow of goods. The quality of the camera that is used is therefore very important for the quality of the overall process.

These types of cameras are generally subjected to certain quality tests during their production. The cameras change their technical measurement properties, however, over the course of their useful life. This occurs, for example, due to a change in the properties of the sensor chip (electronic, physical, chemical). The lighting modules that interact with the camera (or that are even integrated in these) may change their properties (regarding their brightness and illumination) overtime. The reason for this may be the aging of the LEDs that are used.

If the required quality or precision no longer exists, the existing cameras must be replaced with new cameras, which disadvantageously increases processing costs (for example for the processing, management, and/or monitoring of large flows of goods).

The present invention therefore tries to provide a measurement and/or sensor device that makes it possible to reduce these processing costs.

According to the invention, the problem is solved by a measurement and/or sensor device with the features provided herein.

Due to the fact that the measurement and/or sensor device has a memory unit in which data pertaining to the control of the measurement and/or sensor device, in particular the camera, is stored, such a measurement and/or sensor device can be not only calibrated (detection/identification of a measurement error) but can even be readjusted (reduction or removal of a measurement error) by making alterations to the data.

Hereby, a cost-intensive replacement with a new measurement and/or sensor device, in particular a new camera that meets the quality requirements, can advantageously be avoided.

By providing the ability to (re)adjust the measurement and/or sensor device by changing the data stored in the memory unit, the useful life of the measurement and/or sensor device can be significantly prolonged and the quality requirements met.

To protect this data against unauthorized alterations, the measurement and/or sensor device according to the invention also has a protection device for the memory unit which protects the data stored in the memory unit and thus guarantees compliance with the quality requirements.

According to the invention, the measurement and/or sensor device may also comprise a lighting device so that the data for the control of the measurement and/or sensor device may be data for controlling the camera and/or a lighting device. By (re)adjusting the data for the control of the lighting device, it is possible to compensate not only for (physical) alterations in the lighting device itself but, in the interaction with the camera, alterations in the camera as well.

Furthermore, a measurement and/or sensor device with a preferably integrated controllable lighting unit makes it possible to configure the measurement and/or sensor device, in particular the camera, more independently from the ambient light.

In a preferred embodiment of the invention, the data stored in the memory unit is adjustment data for the adjustment of the measurement and/or sensor device. Adjustment data may be, for example, data for the adjustment of the camera such as the aperture, focal length, white balance, ISO and the exposure time, the distance between the camera and the object, etc., and/or data for the adjustment of a lighting device such as brightness, color, intensity, luminosity, time response (pulsed operation), etc.

In a particularly preferred embodiment of the invention, the protection device is configured as a mechanical access block, for example in the form of a switch to block or release a write line of the memory unit. In the operating mode, the switch to prevent an unauthorized operation may be additionally provided with a lock, a seal, a lead seal, etc., so that an unauthorized write access to the memory unit quickly becomes apparent when the seal or the lead seal are tampered with or the lock damaged.

It is also conceivable, of course, to configure the protection device as an electronic access block. The write line (or the write channel) can be interrupted, for example, by means of an electronic switch (or an electronic circuit) and only be released in response to a special request/signal (for example, by means of an electronic lock) to allow, in the adjustment mode, a write access to the data stored in the memory unit.

It is also conceivable, of course, to configure the protection device as a software-implemented access block. This way, a program module, for example in an image processing computer or a storage-programmable control (SPC) for the write access to the memory unit, may be protected against unauthorized use, and/or the startup of this program module may only be possible when the protection device is deactivated, for example following a respective authentication.

Potential other realizations of the aforementioned embodiments of a protection device may be software-implemented solutions, such as a monitoring and/or a protocol such as log files, audit trail, etc., of the data write access. Unauthorized access may be prevented and/or an already occurred unauthorized access may be detected or uncovered by means of such realizations of a protection device as well. In the event that unauthorized access is attempted, it is obviously conceivable as well to emit an alarm (optical, acoustic, or as a message) and/or temporarily or permanently disable the operating mode.

It is furthermore conceivable to configure the protection device in electronic or software-implemented encryption and/or authentication in a network.

A write access to a memory unit in the network or to the data stored there may be protected by a corresponding encryption as well as by an authenticated allocation. It is also conceivable to protect the read access to a memory unit in the network by means of a corresponding encryption as well as an authenticated allocation.

This way, according to the invention, it is even possible by means of a memory unit at a decentralized location in a network (Intranet, Internet, Cloud, etc.) to protect the data stored there against an unauthorized write access and potentially and additionally against an unauthorized read access.

For the realization in particular of the aforementioned electronic and software-implemented protection device, the measurement and/or sensor device may comprise a control device that controls the access to the memory unit and is itself configured as a protection device.

In a further embodiment of the invention, the measurement and/or sensor device has an operating mode in which the protection device is active. In addition to this operating mode, the measurement and/or sensor device may, in a preferable embodiment, comprise at least one further mode, an adjustment mode or an adjustment function in which the protection device is deactivated and adjustment data generated.

The measurement and/or sensor device, in particular the camera and/or lighting device, may be adjusted only in the adjustment mode. To this purpose, an otherwise blocked adjustment function is released, for example by means of the control device, and the camera and/or lighting device adjusted. The blocking and release of the adjustment function may be performed by the protection device for the memory unit or by a separately formed protection device (hardware- or software-implemented as well).

Data generated in this adjustment mode, in particular image data, can preferably be differentiated from data generated in the operating mode, in particular image data. To differentiate, a corresponding bit may be set in the data generated in the operating mode and/or at least one specific (data) information may be missing. The data generated in the operating mode may include at least one unique piece of information for a measurement and/or sensor device such as a serial number, technical measurement characteristics that must be checked, a date, adjustment factor, software version, etc., whereas data generated in the test mode lack such information and/or no image or measuring data is provided to the user or the application purpose.

In this adjustment mode, the hardware- and/or software-implemented protection of the protection device or the protection devices is clearly lifted. In a hardware-implemented embodiment of the protection device, the protection may be lifted, for example, through the breaking of a respective seal or a lead seal.

In the adjustment mode and/or by means of the adjustment function, adjustment data for the correct adjustment of the measurement and/or sensor device is determined, for example, by means of a correspondingly configured control device and stored in the memory unit. As explained above, adjustment data may be, for example, data for the adjustment of the camera such as the aperture, focal length, white balance, ISO and the exposure time, the distance between the camera and the object, etc., and/or data for the adjustment of a lighting device such as brightness, color, intensity, luminosity, time response (pulsed operation), etc.

When adjusting the measurement and/or sensor device, data, in particular image data or measurement data, may be generated on the output-side, for example, by means of a referenced standard (input-side) and a corresponding adjustment or modification of the adjustment of the measurement and/or sensor device, in particular the camera. The corresponding adjustment of the adjustment is then stored in the memory unit as new adjustment data. When leaving the adjustment mode, the protection device is activated again so that the adjustment data and/or the adjustment function is protected against unauthorized access.

In a particularly preferred embodiment of the invention, the camera is a digital camera configured to inspect an object by means of reflecting light or screening (for transparent objects with lights or nontransparent objects with x-ray).

In a further embodiment of the invention, the measurement and/or sensor device may be configured as an x-ray measurement and/or sensor device. In this case, the camera may be configured as a sensor, in particular a line sensor, which directly or indirectly converts the x-rays penetrating the object to be tested or inspected (by means of a scintillator for example). This way, it is possible to inspect not just the exterior (contour, surfaces, color design, pattern, labels that were printed on or affixed) but also the interior of objects (products, packaging, etc.). It is also conceivable to configure the measurement and/or sensor device on the basis of the terahertz spectroscopy (also called submillimeter waves, far infrared or far IR spectroscopy) and to configure in particular the camera as a terahertz camera or terahertz scanner.

The invention explained above in different embodiments preferably serves not only for the monitoring of the quality of identifications (IDs, identifiers, labels, characteristics, etc.) on products or packaging as well as the monitoring and/or measurement of permitted dimensions and content of objects, but may also assist with a better or even completely automated track and trace of objects such as products, packaging, or packaged products. In particular, manipulations can be impeded or even prevented entirely. Potential protected data may be unique data of a measurement and/or sensor device such as the serial number, data that has to be checked, adjustment data, adjustment size, adjustment factor, software version, either individually or in any combination.

In normal operation (operating mode), this (control) data may be loaded onto the camera in different variations explained above or in the unprotected memory located there, for example
- prior to every start of the measurement and/or sensor device for continued operation,
- prior to every mode switch, for example from a standby mode to an active (recording) mode,
- following a predefined time schedule or
- following a predefined number of shots.

For a safe operation, the camera and the control can be electronically locked to prevent an exchange.

Particularly in the case of a camera without any intelligence of its own, an electronic lock can preferably be used between the camera and the control. To this purpose, important operating data and/or identification data from the camera may be stored in the control and rechecked at specific intervals by the control or, for the sake of security, reloaded into the camera. This identifying data may, for example, be the type, type identification, serial number, or the software version of the camera.

In the adjustment mode, the aforementioned identifying data from the camera is stored in the (protected) memory device.

Further advantageous embodiments of the invention are described in the subclaims.

Below, the invention will be explained in further detail on the basis of an exemplary embodiment shown in the drawing.

The schematically shown measurement and/or sensor device 1 shown in FIG. 1 consists in a first embodiment (without the elements shown in dotted lines in the drawing) of a camera 3 and a control device 7 which are connected by means of a communication connection 11 in a unidirectional (in the direction of the camera 3) or a bidirectional manner. The communication connection 11 may, just as with all other communication connections, be hardwired or wireless, in particular by encrypted communication.

Furthermore, the measurement and/or sensor device 1 comprises a lighting device in the form of a lighting unit 19 to sufficiently illuminate an object 21 to be inspected. The object 21 stands as an example for a plurality of objects in a stream of goods which is to be inspected by the measurement and/or sensor device 1 at a high speed. Objects 21 in the stream of goods successively pass by the camera 3 or its lens 23 (if any) at a fixed distance.

To inspect an object 21, the camera 3 is actuated by means of communication connections 11 and the lighting unit 19 is actuated (also unidirectionally or bidirectionally) by means of communication connections 27 to obtain image data for the object.

The control device 7 has a memory unit 5b and a protection device in the form of a switch, in particular a mechanical switch 9b, which is preferably formed inside a housing protected against unauthorized opening. The protection against unauthorized opening may be provided, for example, by applying a lead-seal or seal to the housing.

The switch 9b can be actuated from the outside (slider, lever, etc.) but is protected in this area by a seal against unauthorized operation as well. The electrical contacts of the switch are preferably located on the inside of the housing of the control device 7 so that they cannot be accessed from the outside.

In the memory unit 5b, data is stored by means of which the camera 3 and, preferably, additionally the lighting unit 19, were adjusted to comply with preset parameters (data for the adjustment of the camera 3 such as the aperture, focal length, white balance, ISO and the exposure time, the distance between the camera 3 and the object 21, and the exposure time, etc., and/or data for the adjustment of a lighting device such as brightness, color, etc.)

The corresponding data and/or settings and parameters are therefore protected against an unauthorized modification because the aforementioned seal cannot be broken in a nondestructive manner.

If, during an interval-type or even continuous testing (calibration) of the measurement and/or sensor device 1, a deviation from the preset parameters is determined, the measurement and/or sensor device 1 according to the invention may be newly adjusted or readjusted by authorized personnel. To this purpose, the seal of the switch 9b is broken and a new adjustment, in particular a readjustment, is performed to address any measurement deviation by modifying the adjustment until the measurement and/or sensor device 1 meets the requirements again, which may be tested.

To this purpose, an otherwise blocked adjustment function is released, for example by means of the control device 1, and the camera 3 and/or lighting unit 19 adjusted. The blocking and release of the adjustment function or the adjustment mode may be performed by the hardware- or software-implemented protection device, for example by means of switches 9a, 9b or by means of a separately formed protection device not shown here (hardware- or software-implemented as well).

To adjust the camera 3 and/or the lighting unit 19, image data is generated on the output side by means of a reference standard (on the input side) and an adjustment and/or modification of the adjustment of the camera 3 and/or the lighting unit 19 correspondingly performed by the control device 7, which are to be within a desired tolerance. The corresponding adjustments of the adjustment are then stored in the memory unit 5a, 5b, 5c by means of the correspondingly formed control device 7 as new adjustment data. When leaving the adjustment mode, the protection device is activated again so that the adjustment data is protected against unauthorized access.

In addition to the data for the adjustment of the camera and/or the data for the adjustment of the lighting unit 19, adjustment variables for the modification of existing variables, in particular an adjustment factor, may be considered adjustment data as well.

After having successfully performed the adjustment and after the new adjustment data has been stored in the memory unit 5b, the switch 9b is resealed so that the new data is protected once again against unauthorized access.

In a second embodiment of the invention, the switch may be formed in the camera 3 or within its housing as a switch 9a and the memory unit as memory unit 5a instead of the control device 7. The protection against unauthorized access is provided here accordingly in the manner explained above for the first embodiment. To control the camera 3 and the lighting unit 19, a separate control device 7 may be provided just as in the first embodiment. This control device 7 can certainly also be partially or fully integrated in the camera 3 or formed inside the housing of the camera 3.

In a third embodiment, the memory unit is configured as a memory 17 in a network or a cloud. There, the memory 17 is protected against an unauthorized modification of the data stored therein by means of a software-implemented protection device. The data is encrypted, for example, with the corresponding secret key having to be used to modify the data. Preferably, an authentication for write access to the memory 17 may be required alternatively or additionally. Clearly, the control device 7 may be formed separately or partially or completely integrated in the camera 3 in this embodiment. The communication between the memory 17 and the control device 7 then takes place by means of a preferably bidirectional communication connection 31 or alternatively between the memory 17 and the camera 3 or by means of a communication connection 29

In the fourth embodiment, a user terminal 13, for example a personal computer, may be provided instead of the control device 7 or additionally to the control device 7. If, in this embodiment, the protected memory unit 5a or 5b is configured in the camera 3 or in the control device 7 or as a memory 17 in the network or the cloud, the operation terminal 13 provides for a convenient operation of the measurement and/or sensor device 1. The communication between the operation terminal 13 and the control device 7 or between the operation terminal 13 and the camera 3 (continued dotted line through the control device 7) is made possible by a communication connection 15, which is protected against manipulation by a seal and/or encrypted data access and/or authentication. Instead of the variations described above, however, it is also possible to configure the memory unit as memory unit 5c in the operation terminal and to protect it there against unauthorized access in the respective manner described above for memory units 5a and 5b.

Finally, it should once again be pointed out that the device according to the invention is not just limited to cameras or inspection devices for the detection of optical codes, but that it can be used in the same manner for other optical detection tasks and/or devices. The invention may also be used, for example, for a camera and/or inspection device for the detection of optical structures as part of an inspection of the optical characteristics of components or a camera and/or an inspection device for the verification of the completeness of the mounting of circuit boards and a respective adjustment. The invention may also be used for cameras in other applications, for example cameras for automotive applications (cameras for lane assistance as well as cameras for autonomous driving, traffic sign detection, etc.), for example in the context of regularly scheduled inspections.

LIST OF REFERENCE SIGNS

1 Measurement and/or sensor device
3 Camera
5a Camera memory unit
5b Memory unit in the control device
5c Memory unit in the operation terminal
7 Control device
9a Switch in the camera
9b Switch in the control device
11 Communication connection between the camera and the control unit
13 Operation terminal
15 Communication connection
17 Memory in network or cloud
19 Lighting unit
21 Object
23 Objective/lens
25 Communication connection between the camera and lighting
27 Communication connection between the control device and lighting
29 Communication connection between the camera and the memory in network or cloud
31 Communication connection between the control device and the memory in network or cloud
A Distance between the object and the camera or its objective/lens

The invention claimed is:

1. A measurement and/or sensor device with a camera and a memory unit, as well as data stored in the memory unit for controlling the measurement and/or sensor device, wherein
   the measurement and/or sensor device comprises a protection device for the memory unit in the form of a mechanical, electronic, or software-implemented access lock which protects the data stored in the memory unit against unauthorized alteration, and
   the control data stored in the memory unit comprises adjustment data for the adjustment of the measurement and/or sensor device to reduce or eliminate measurement errors,
   wherein the access lock is further configured to document any access to prevent unnoticed access to the measurement and/or sensor device.

2. The measurement and/or sensor device according to claim 1, wherein the measurement and/or sensor device has an operating mode in which the protection device is active.

3. The measurement and/or sensor device according to claim 1 or 2, wherein the measurement and/or sensor device has an adjustment mode, implemented via a control device, in which the protection device is deactivated to perform an adjustment of the measurement and/or sensor device and to store the adjustment data obtained in this process in the memory unit.

4. The measurement and/or sensor device according to claim 1, wherein the protection device is configured to protect the data stored in the memory unit against unauthorized alteration by protecting the data stored in the memory unit from write access.

5. The measurement and/or sensor device according to claim 1, wherein the camera is configured as a digital camera.

6. The measurement and/or sensor device according to claim 1, wherein the measurement and/or sensor device is configured as an x-ray measurement and/or an x-ray sensor device.

7. The measurement and/or sensor device according to claim 1, wherein the measurement and/or sensor device has a control device with the control device controlling the access to the memory unit and the control device being configured as the protection device.

* * * * *